United States Patent Office 3,755,436
Patented Aug. 28, 1973

3,755,436
PRODUCTION OF CITRIC ACID
Richard H. Wiley, New York, N.Y., assignor to
Miles Laboratories, Inc., Elkhart, Ind.
No Drawing. Filed Mar. 2, 1972, Ser. No. 231,383
Int. Cl. C07c 59/16
U.S. Cl. 260—535 P
2 Claims

ABSTRACT OF THE DISCLOSURE

Citric acid can be produced by the bimolecular decarboxylative self-condensation of oxaloacetic acid followed by oxidative decarboxylation with hydrogen peroxide. Citric acid can then be recovered from the resulting products.

BACKGROUND AND PRIOR ART

Citric acid is a well-known item of commerce. It is generally produced by the selective fermentation of carbohydrates. Various organic syntheses of citric acid have been proposed, but these syntheses have usually involved expensive reactants and extreme reaction conditions which render them non-competitive commercially with the fermentation process. There is thus a need for an inexpensive non-fermentation organic synthesis of citric acid.

SUMMARY OF THE INVENTION

In accordance with the present invention, a process for the production of citric acid is provided which comprises the bimolecular decarboxylative self-condensation of oxaloacetic acid followed by oxidative decarboxylation with hydrogen peroxide.

DESCRIPTION OF THE INVENTION

The oxaloacetic acid used as a raw material for the production of citric acid is well-known and is available commercially. It can also be prepared by palladium chloride-catalyzed air oxidation of maleic acid as described in U.S. Pat. No. 3,356,721.

In the first step of this novel process, the oxaloacetic acid is reacted with itself in an aqueous medium at a temperature from about 20° C. to about 30° C. and at a pH from about 3 to about 11. Preferably the pH is from about 7 to about 8.5. The initial desired pH is achieved by adding an appropriate amount of alkaline material, such as sodium hydroxide, to the oxaloacetic acid solution. In the second step of the process, the hydrogen peroxide is reacted with the reaction products of the first step at temperatures from about 3° C. to about 30° C.

The invention is described in further detail in the following examples.

Example 1

A solution of 150 mg. of oxaloacetic acid in 1 ml. of water was adjusted to pH 7 by the addition of 20 weight percent aqueous sodium hydroxide. The resulting mixture was allowed to stand at room temperature (about 24° C.) for 3 weeks at which time the solution pH was 8.5. To this solution was then added 1 ml. of 30 percent hydrogen peroxide. The resulting mixture was then allowed to stand at room temperature for 2 hours. A sample of the reaction product solution was analyzed by thin layer chromatography using silica gel on polyester sheets as the plate and butanol-formic acid-water as the developing solvent. The plate was dried after spotting at room temperature, developed for 15 min., dried at 80° C. for 15 min. and sprayed with 0.4 percent alcoholic bromocresol green solution. The spots appear as yellow areas on a blue background. A spot was produced having an $R_f$ value of 63–64 which corresponds to an $R_f$ value of 62 for a citric acid control.

Example 2

The procedure of Example 1 was repeated using reaction times in the first step of 6, 15 and 24 hours and a pH in the first step of 3, 5, 9 and 11. All of these runs produced products having a spot corresponding to citric acid upon thin layer chromatography analysis.

Example 3

A solution of 1.5 g. of oxaloacetic acid in 10 ml. of water was adjusted to pH 7 with sodium hydroxide. After 22 hours at room temperature, the solution had a pH of 8.4 and was cooled to 6° C. in an ice bath. To this solution were then added 10 ml. of cold (6° C.) 30 percent hydrogen peroxide. The temperature was then increased to 23° C. and there was vigorous gas evolution. The pH changed to 6.4. The solution was then cooled to 3° C., allowed to stand cold for one hour, and then warmed to room temperature under a stream of air to evaporate the solution to dryness. The resulting solid was analyzed by thin layer chromatography to indicate the formation of citric acid. Development with ethanol-ammonia solvent gave a spot with an $R_f$ value of 22 corresponding to $R_f$ values of 21–23 observed with authentic samples of citric acid.

Example 4

A solution of 1.5 g. of oxaloacetic acid in 10 ml. of water at pH 7 was reacted with itself at room temperature for 14 days. To this solution was added 1 ml. of 30 percent hydrogen peroxide and the resulting mixture was allowed to stand at room temperature for 4 days. A 3 ml. portion of 60 weight percent aqueous calcium chloride solution was then added and the resulting precipitate collected. This was dried, suspended in 40 ml. of dry ether and then treated with 0.2 ml. of concentrated sulfuric acid in 10 ml. of ether. The ether layer was separated, dried and evaporated to give a semi-crystalline solid. This was analyzed by thin layer chromatography to indicate the formation of citric acid. The infra-red spectrum of the sample thus prepared was identical in all respects with that of an authentic sample of citric acid monohydrate.

In the above example there was an 88 percent conversion of oxaloacetic acid to calcium citrate and a 34 percent conversion of calcium citrate to citric acid for an overall yield of oxaloacetic acid to citric acid of 30 percent.

What is claimed is:

1. A process for the production of citric acid which comprises the bimolecular decarboxylative self-condensation of oxaloacetic acid at about 20 to 30° C. and at a pH of about 3 to 11 followed by oxidative decarboxylation with hydrogen peroxide at about 3° C. to 30° C.

2. A process according to claim 1 wherein the first step is carried out at a pH of about 7 to 8.5.

References Cited

UNITED STATES PATENTS 2,754,325   7/1956   Smith _____ 260—535

LORRAINE A. WEINBERGER, Primary Examiner

P. J. KILLOS, Assistant Examiner